(12) United States Patent
Eisenberg et al.

(10) Patent No.: US 6,434,194 B1
(45) Date of Patent: Aug. 13, 2002

(54) COMBINED OOK-FSK/PPM MODULATION AND COMMUNICATION PROTOCOL SCHEME PROVIDING LOW COST, LOW POWER CONSUMPTION SHORT RANGE RADIO LINK

(75) Inventors: John A. Eisenberg, Los Altos; Douglas C. Bowman, Capitola; Huong M. Hang, San Jose, all of CA (US)

(73) Assignee: Wherenet Corp, Santa Clara, CA (US)

( * ) Notice: Subject to any disclaimer, the term of this patent is extended or adjusted under 35 U.S.C. 154(b) by 0 days.

(21) Appl. No.: 09/185,467

(22) Filed: Nov. 3, 1998

Related U.S. Application Data (60) Provisional application No. 60/064,515, filed on Nov. 5, 1997.

(51) Int. Cl.$^7$ ................................................. H03K 7/08
(52) U.S. Cl. ........................ 375/238; 375/239; 375/272
(58) Field of Search .................................. 375/238, 237, 375/150, 300; 455/127; 342/418; 341/53

(56) References Cited

U.S. PATENT DOCUMENTS 5,132,985 A * 7/1992 Hashimoto et al. ......... 375/151

* cited by examiner

*Primary Examiner*—Stephen Chin
*Assistant Examiner*—Heechul Kim
(74) *Attorney, Agent, or Firm*—Allen, Dyer, Doppelt, Milbrath & Gilchrist, P.A.

(57) ABSTRACT

A communication system provides robust, short range radio communications between battery operated devices by using ON-OFF-KEYED (OOK) modulation and either frequency shift keyed (FSK) modulation or pulse position/width modulation (PPM/PWM), in combination with a prescribed communications protocol. The system transmitter requires no local oscillator and is only active during actual communication, so that its current drain is not a significant factor in total battery life. Also, the receiver is active for only a small fraction of time. The need for large, complex and expensive filters is minimized by using a single IF band-pass filter in active form or passively in the form of a low cost ceramic filter such as those used in inexpensive transistor radios. The digital transmitter and receiver portions of the system are implemented by low cost, and ultra low power CMOS logic.

22 Claims, 7 Drawing Sheets

COMBINED OOK-FSK/PPM MODULATION AND COMMUNICATION PROTOCOL SCHEME PROVIDING LOW COST, LOW POWER CONSUMPTION SHORT RANGE RADIO LINK

CROSS-REFERENCE TO RELATED APPLICATION

The present application claims the benefit of U.S. provisional application Ser. No. 60/064,515, filed Nov. 5, 1997, entitled "Modulation Means and Communications Protocols for a Very Low Cost, Low Power Consumption Radio Link."

FIELD OF THE INVENTION

The present invention relates in general to communication systems, and is particularly directed to a low cost communication system that obviates the need for a local oscillator, by employing ON-OFF-KEYED (OOK) modulation that is driven by an associated phase/frequency baseband control signal, such as frequency shift keyed (FSK) modulation, pulse position modulation (PPM), pulse width modulation (PWM) and the like, with a prescribed communications protocol that is effective to provide robust, short range radio communications between battery operated devices.

BACKGROUND OF THE INVENTION

Radio frequency identification (RFID) and other types of communication systems often require that a short-range communications link (e.g., a link on the order of one inch to one hundred feet) be established between sites/devices. An essential prerequisite for such a link is that communications thereover be reliable in the presence of interference from "noise" sources, such as, but not limited to, transmissions from wireless local area networks and RF emissions from microwave ovens. In addition, it is desirable that such short-range systems enjoy low to moderate data rates, long battery life and very low cost. Unfortunately, the low cost and low power operation requirement typically mandates the use of highly integrated, off the shelf, or custom radio frequency integrated circuits (RFICs); the use of complex or expensive RF or IF filters, that are normally found in radio systems to reject interference, is precluded for cost reasons.

SUMMARY OF THE INVENTION

The present invention successfully meets the foregoing objectives by providing a relatively low cost short-range communication system, that eliminates the use of a local oscillator by on-off keying (OOK) an RF carrier signal with a phase/frequency modulated baseband control signal, associated with the data to be transmitted, such as frequency shift keyed (FSK), pulse position modulation (PPM), pulse width modulation (PWM) and the like, in a manner that enjoys very low current consumption and thereby reduces power drain. The transmitter is active (keyed ON and OFF) only during actual communication, so that its current drain is not a significant factor in total battery life. Likewise, the receiver is active for only a small fraction of time. The need for large, complex and expensive filters is minimized by using an amplifier detector type receiver which does not require a costly, power-hungry local oscillator and by using a single IF band-pass filter in active form or passively in the form of a low cost ceramic filter such as those used in inexpensive transistor radios. The digital portion of the system can be realized using low cost, and ultra low power CMOS logic. In the present description the term IF shall be understood to mean the detected OOK pulse train produced by the amplitude detector.

As will be described, OOK RF pulses produced by the transmitter's OOK modulation scheme are encoded with data representative baseband control signal, the data values of which are represented by phase/frequency information, such as frequency shift keyed (FSK) data, pulse position modulated (PPM) data, pulse width modulated (PWM) data, and the link, with the data being differentially encoded prior to the modulation process. In an FSK embodiment, the output of transmitter is keyed on and off by pulses at two different frequencies, one above and one below the IF center frequency, respectively associated with different logical states. An IF center frequency of 455 KHz may be employed to take advantage of readily available low cost ceramic filters. The transmission period for the transmission of a logical '1' is made the same as that for the transmission of a logical '0' by properly scaling the number of OOK pulses sent and the choice of FSK frequency offsets from the IF center frequency. The OOK-FSK transmitter contains a digital signal processing section comprised of an arrangement of counters and shift registers, that are operative to address and read a system random access memory (RAM) for accessing parallel data and converting this data into OOK modulation pulses representing differentially encoded serial data.

In each the OOK-FSK and OOK-PPM/PWM embodiments, the overall receiver protocol is the same. The receiver first detects incoming data by detecting incoming OOK pulses. The preamble bytes contain a known data pattern. The first byte is over-sampled and run through a correlator to synchronize the receiver. The second byte of the preamble is examined to verify that the beginning of a message is being received. Once the preamble is detected, the receiver proceeds to input the data portion of the message and then verifies the CRC at the end of the message. In addition, each receiver may contain a common received signal detection and preamplification portion to demodulate OOK-FSK and OOK-PPM/PWM transmissions.

The common portion of each FSK and PPM/PWM receiver includes a narrow band antenna, to provide a measure of RF selectivity, and reject out of band interference. The output of antenna is coupled to an AM detector with or without RF preamplification, which recovers the pulse train that was originally transmitted by the OOK transmitter. This pulse train is amplified by a high gain, low noise IF amplifier and band-pass filtered. The band-pass filter's center frequency is matched to the transmitter's on/off keying rate. To keep cost low, the band pass filter may be implemented as an active filter within an overall RF integrated circuit. As noted above low cost ceramic or other passive components may be used. The output of the band-pass filter is coupled to one or more limiting amplifier stages to remove amplitude modulation from the recovered pulses. The amplitudes of the recovered pulses may be measured by means of a conventional received signal strength indicator (RSSI) circuit.

The output of the RSSI circuit is compared with a 'valid' signal level threshold. The result of this comparison is used to gate the recovered data waveform, to ensure that a sufficient signal level is detected to provide valid data, and thereby prevent potentially false data from being coupled to downstream digital processing circuitry. In the FSK receiver, the recovered IF signal is coupled to a digital tone detector which determines if the OOK-FSK pulse rate is within limits, and to an FM discriminator circuit which demodulates the FSK encoded data, such as a conventional resonant quadrature detector. The output of the FM discriminator varies between two voltages as determined by the OOK rate of the transmitter. This alternating voltage signal is converted to respective logic levels for downstream digital processing.

The digital tone detector comprises an arrangement of counters and comparison logic to validate the received OOK data by verifying that the OOK pulse repetition rate is correct. The digital FSK processing circuitry comprises an arrangement of shift register, counters and control logic that is operative to integrate the received data that has been validated by the received signal strength indicator circuit and FM discriminator circuits, verifies and synchronizes to the preamble, converts the validated data into parallel format, and then writes the recovered data to system RAM.

In an PPM-OOK/PWM-OOK embodiment, the output of the transmitter is keyed on and off by pulses that are shifted in phase by the data, rather than using different frequencies to denote different data values. The OOK pulse rate is maintained at a fixed IF center frequency. Data is encoded by shifting the phase or widths of groups of pulses by a prescribed amount (e.g., 180 degrees for a basic PPM or PWM scheme) from following groups where the data bit is a first logical value, (e.g., '1'), and not shifting it where the data bit has a second logical value (e.g., '0'). A shift in phase is effected by beginning the next pulse group one half (or one plus a half) OOK periods at the IF center frequency where a 180 degree phase shift is needed. Otherwise, the next pulse group is transmitted one OOK period after the transmission of the last pulse in the previous group. The digital portion of the OOK-PPM/PWM transmitter circuit comprises an arrangement of counters and shift registers, that are operative to address and read the system RAM to obtain parallel data and then convert this data into the OOK modulation pulses representing the differentially encoded serial data.

In the PPM or PWM receiver, since there is no FM demodulator, the recovered IF signal is coupled directly to each of the digital tone detector and RSSI threshold and comparator-gate circuitry, which ensures that a sufficient signal level is present to provide valid data, and prevent potentially false data from being coupled to downstream PPM/PWM digital processing circuitry. The digital portion of the OOK-PPM/PWM receiver is operative to recover phase information in the received encoded data stream. Although the OOK-PPM/PWM receiver's digital processor is somewhat more complex than the OOK-FSK digital processor, the OOK-PPM/PWM digital processing circuitry effectively performs all of the same tasks as the OOK-FSK processor in addition to decoding the data.

The digital receiver circuitry may operate at a sample clock rate that is at a prescribed fraction of the time between incoming OOK pulses. As will be described, the digital PPM/PWM receiver uses an up/down counter mode of operation to provide reliable data detection in environments where some input pulses will be corrupted. The circuit compares the phase of each bit of the received data validated by the received signal strength indicator circuit and discriminator circuitry. It then verifies and synchronizes to the preamble, converts the data to parallel and writes the recovered data to system RAM.

DETAILED DESCRIPTION

Before describing in detail the new and improved low cost, short range communication system in accordance with the present invention, it should be observed that the invention resides primarily in what is effectively a prescribed arrangement of conventional communication circuits and associated digital signal processing components and attendant supervisory control circuitry therefor, that controls the operations of such circuits and components. Consequently, the configuration of such circuits components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the system in a convenient functional grouping, whereby the present invention may be more readily understood.

Figure 1:
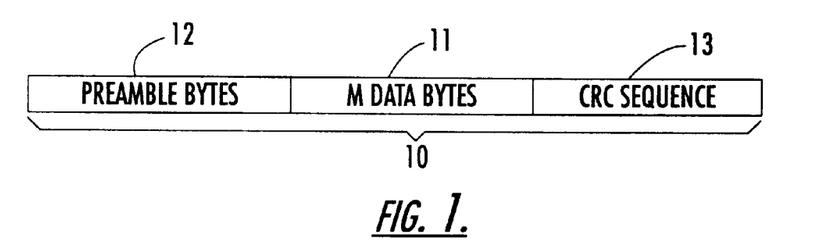
FIG. 1 diagrammatically illustrates the transmitter protocol employed by each of the FSK and the PPM/PWM modulation schemes of the present invention.

As described briefly above, in each of the modulation schemes employed by the present invention, the overall transmitter protocol is the same. As diagrammatically illustrated in FIG. 1, although not limited to any particular parametric value, the data path of a respective message 10 may comprise a sequence of M standard eight bit wide data bytes 11, that follow or appended to a message preamble, such as a sixteen bit preamble 12 containing a pre-defined data pattern, that is readily recognized by the receiver. This message preamble 12 is used to synchronize the receiver prior to the first actual data byte being sent. The message is terminated by a cyclic redundancy check (CRC) sequence 13, that follows the last data byte. The CRC sequence may comprise a sixteen bit CRC sequence, successive bits of which are calculated as each data bit is transmitted. The CRC sequence 13 allows the receiver to determine that all the data bytes have been received with an extremely low probability of error (less than 0.0015%).

The basic modulation employed by the transmitter is an on/off keying (OOK) modulation scheme, operating at a rate determined by the center frequency of the receiver IF band-pass filter. The duty cycle of the OOK waveform may be chosen to take advantage of FCC rules, which allow the use of increased peak power in a variety of unlicensed communication scenarios. In accordance with the present invention, the OOK RF pulses are further encoded with baseband phase/frequency control data, such as frequency shift keyed (FSK) data or pulse position, pulse width modulated (PPM/PWM) data. Data transmitted using either the OOK-FSK or OOK-PPM/PWM modulation types is differentially encoded prior to the modulation process. For either of these alternative modulation formats, the output of the transmitter's RF source is gated on and off by a suitable RF switch, Gilbert cell, keyed power amplifier or other OOK switching mechanism or combination of switching mechanisms, at a prescribed transmit frequency (e.g., 2467 MHz, as a non-limiting example).

Figure 2:
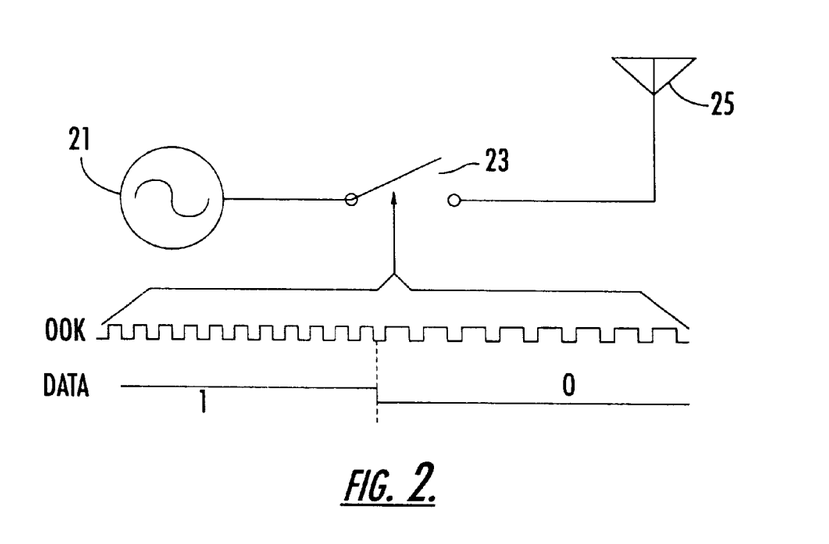
FIG. 2 diagrammatically illustrates the transmitter of the OOK-FSK embodiment of the invention.
Figure 3:
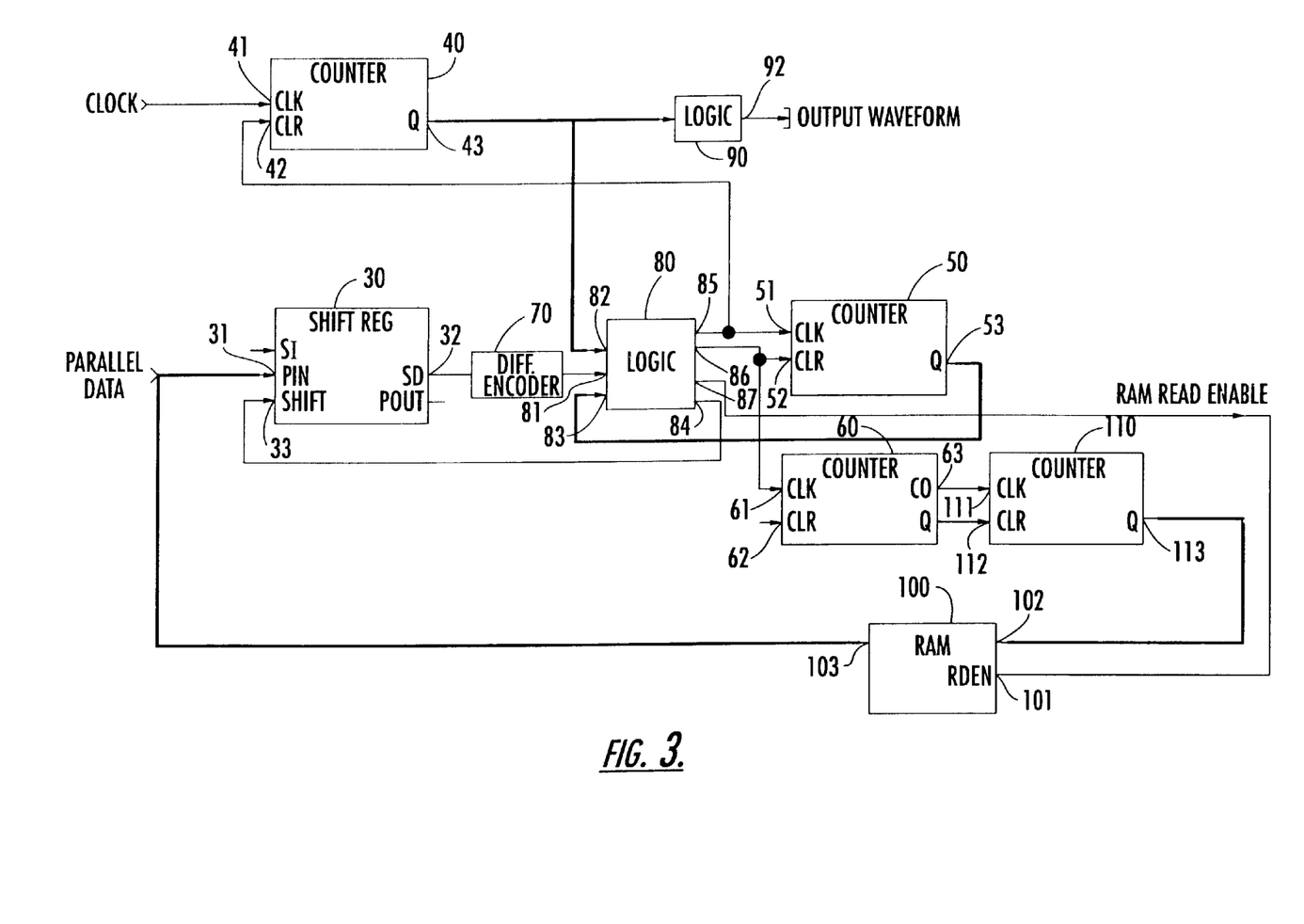
FIG. 3 diagrammatically illustrates the digital portion of an OOK-FSK transmitter.

FSK-OOK Modulation (FIGS. 2–6)
FSK-OOK Transmitter (FIGS. 2–3)

A first embodiment of the invention, diagrammatically illustrated in FIGS. 2–6, employs frequency shift keying (FSK) modulation. As shown in FIG. 2, modulated data output of an RF source or transmitter 21 is coupled through an on-off keyed switch 23 to a narrow bandwidth antenna 25. (It should be noted that antenna 25 may be shared by both the transmitter and the receiver, as long as simultaneous transmission and reception is not required). In the present example of OOK-FSK operation, the output of RF source 21 is keyed on and off by pulses at two different rates, one above and one below the receiver IF center frequency. (For the second embodiment of OOK-PPM/PWM operation, to be described, the output of the transmitter is keyed on and off by pulses that are shifted in phase in accordance with the data.) In both cases the OOK waveform is generated by the transmitter's digital logic circuitry.

In the first (FSK) embodiment of combined OOK-FSK modulation, it is the frequency of the modulation that defines the logical state of each bit of data. A logical '0' is represented by transmitting a first prescribed number of OOK pulses (nineteen, as a non-limiting example) at a first, relatively low IF frequency that is slightly below the IF center frequency (e.g., 376.8 KHz, as a non-limiting example). A logical '1' is represented by transmitting a second prescribed number of OOK pulses (twenty-seven, as a non-limiting example) at a second, relatively IF high frequency, that is slightly above the IF center frequency (e.g., 535.4 KHz, as a non-limiting example). For this parametric range, an IF center frequency of 455 KHz may be employed to take advantage of readily available low cost ceramic filters. The transmission period for the transmission of a logical '1' is made the same as that for the transmission of a logical '0' by properly scaling the number of OOK pulses sent and the choice of FSK frequency offsets from the IF center frequency.

The digital portion of the OOK-FSK transmitter circuit is diagrammatically illustrated in FIG. 3 as comprising an arrangement of counters and shift registers, that are operative to address and read a system random access memory (RAM) 100 for accessing parallel data and converting this data into OOK modulation pulses representing differentially encoded serial data. For this purpose, a shift register 30 has a parallel input port 31 that is coupled to receive a respective byte (preamble byte, data byte, or CRC byte) of a message to be transmitted from a data port 103 of RAM 100. Shift register 30 is synchronously parallel-loaded when each of a set of counters 40, 50 and 60 is cleared. An individual data bit is shifted out from the serial output port 32 of shift register 30 by a shift clock applied to shift input 33 from output 84 of a comparison logic circuit 80, each time counters 40 and 50 are cleared. As data is shifted out of the serial output port 32 of shift register 30, it is differentially encoded by an encoder 70, the output of which is coupled to a first input 81 of comparison logic circuit 80.

Comparison logic circuit 80 and other comparison logic circuits to be described are preferably implemented as a gate array architecture that simulates the functionality of a prescribed set of combinational logic and flip-flops for executing a predetermined set of digital signal processing operations. Since such gate array components are conventional, rather than describe the hardware employed, the present description will detail the effects of the logic operations on various inputs (e.g, accumulated counter and shift register values to which the logic circuits respond).

Counter 40, which has a first input 41 coupled to receive a system clock signal, is used to count the interval between the consecutive OOK pulses. Counter 40 has its clear port 42 coupled to an output 85 of comparison logic circuit 80, so that counter 40 is synchronously cleared by a predetermined count value that is determined by the data bit being sent. Counter 40 has its Q output port 43 coupled to input 82 of comparison logic circuit 80, and to a duty cycle logic circuit 90, which generates a duty cycle waveform at its output port 92. The Q output port 43 of counter 40 is used to cause comparison logic circuit 80 to shift data out from the serial output port 32 of shift register 30 when the contents of counter become zero, as noted above. The duty cycle of the OOK transmission is set by keying the RF signal on, for that period of time when the value of the contents of counter 40 and counter 50 become less than a predetermined number corresponding to the data bit being sent.

Counter 50, which is operative to determine the number of OOK pulses transmitted for each data bit, has a clock input 51 coupled to output 85 of comparison logic circuit 80, so that counter 50 is incremented each time counter 40 is synchronously cleared. The number of pulses is determined by the value of the data bit being transmitted. Counter 50 has its clear input 52 coupled to output 86 of comparison logic circuit 80, so as to be synchronously cleared as the last pulse of each bit is transmitted. Counter 50 has its Q output 53 coupled to input 83 of comparison logic circuit 80, which causes the comparison logic circuit 80 to shift data out from the serial output port 32 of shift register 30 when counter 50 rolls over, as described above. Comparison logic circuit 80 has a further output 87 from which a RAM enable signal is applied to an enable port 101 of RAM 100.

Counter 60 is a multi-bit (e.g., three-bit) counter that is operative to count the number of data bits transmitted for each byte. For this purpose, counter 60 has its clock input 61 coupled to the output 86 of comparison logic 80, so that counter 60 is incremented each time counter 50 is synchronously cleared. Counter 60 is synchronously cleared by a start transmission signal applied to its clear input 62. Counter 60 has its carry output 63 coupled to the clock input 111 of a further counter 110. Counter 110 is employed as a data byte pointer, and is incremented each time counter 60 rolls over (from seven to zero), except during transmission of the preamble byte. Counter 110 has its clear input 112 coupled to receive the start transmission signal, so that counter 110 is synchronously cleared thereby. Counter 110 has its output 113 coupled to the address port 102 of the data RAM 100.

Figure 4:
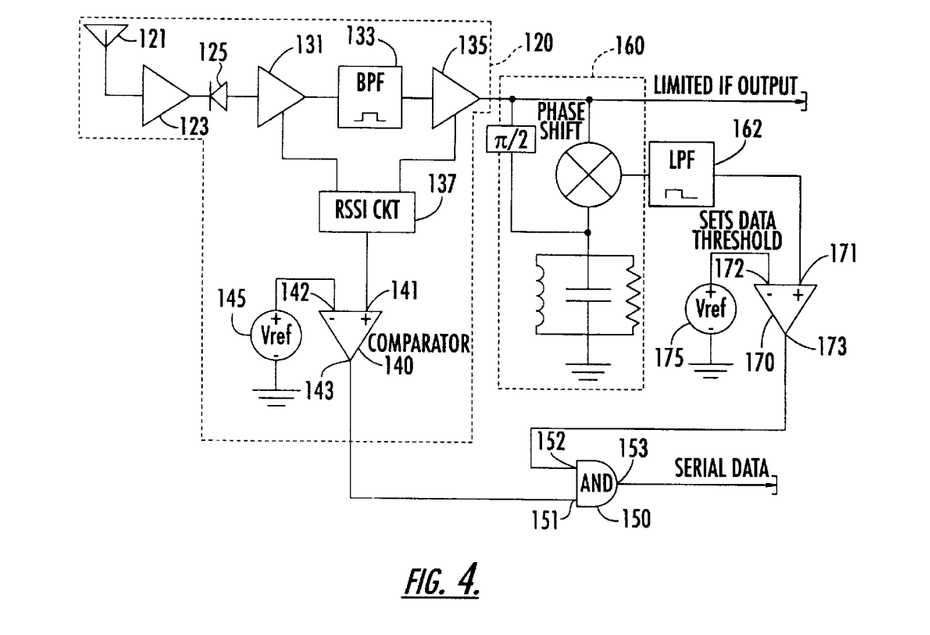
FIG. 4 illustrates the common portion of FSK and PPM/PWM receivers.
Figure 5:
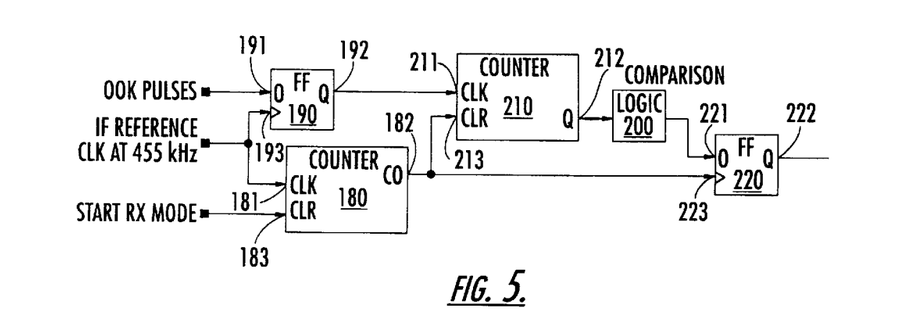
FIG. 5 shows a digital tone detector.
Figure 6:
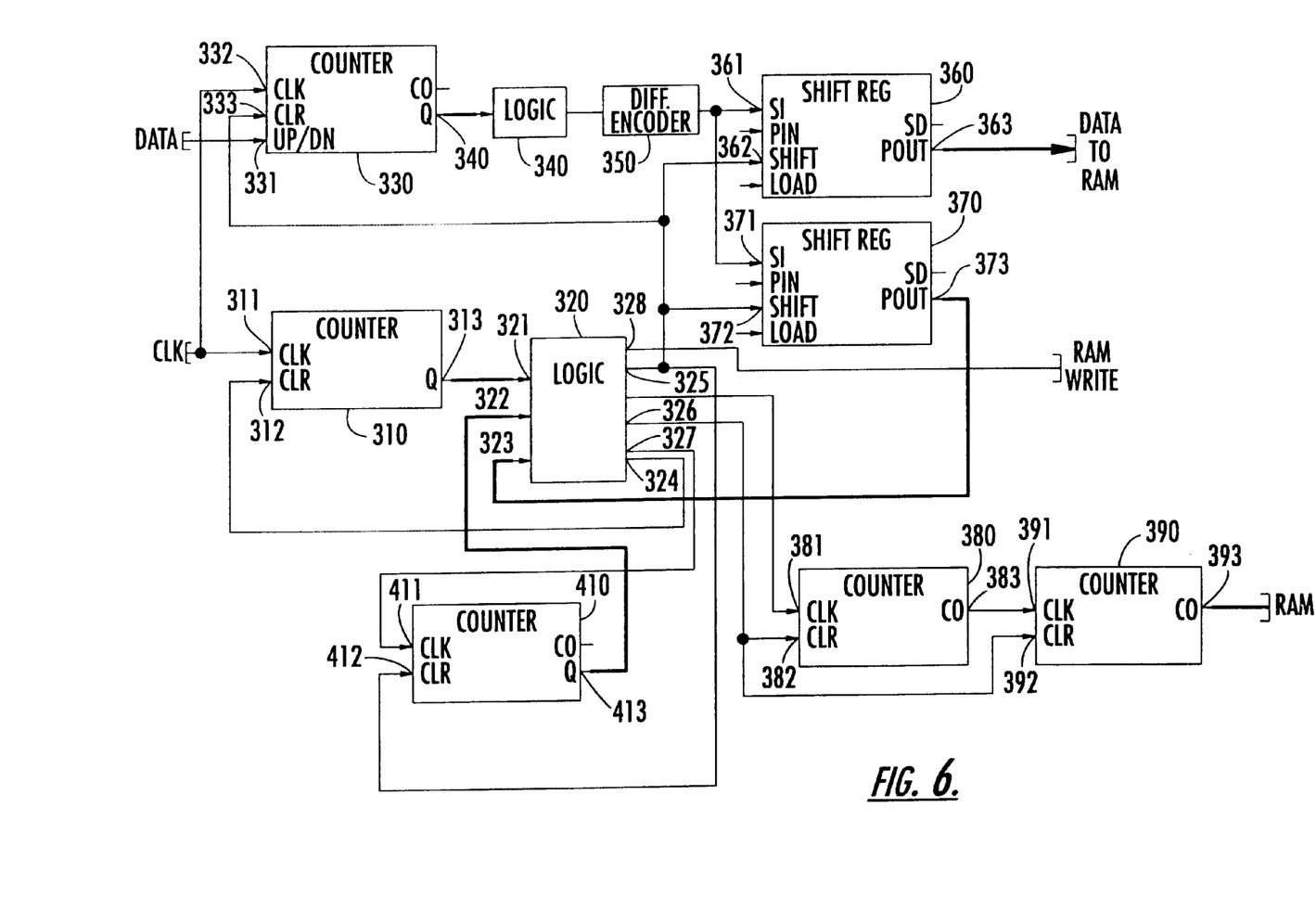
FIG. 6 diagrammatically illustrates the digital portion of an OOK-FSK receiver.

FSK-OOK Receiver (FIGS. 4–6)

As pointed out previously, in both of the OOK-FSK and OOK-PPM or PWM modulation schemes of the present invention, the overall receiver protocol is the same. The receiver first detects incoming data by detecting incoming pulses. The preamble bytes contain a known data pattern. The first byte is over-sampled and run through a correlator to synchronize the receiver. Then the second byte of the preamble is examined to verify that the beginning of a message is being received. Once the preamble is detected, the receiver proceeds to input the data portion of the message and then verifies the CRC at the end of the message. In addition to using a common receive protocol, each receiver may contain a common received signal detection and preamplification portion to demodulate both OOK-FSK and OOK-PPM/PWM transmissions.

Figure 9:
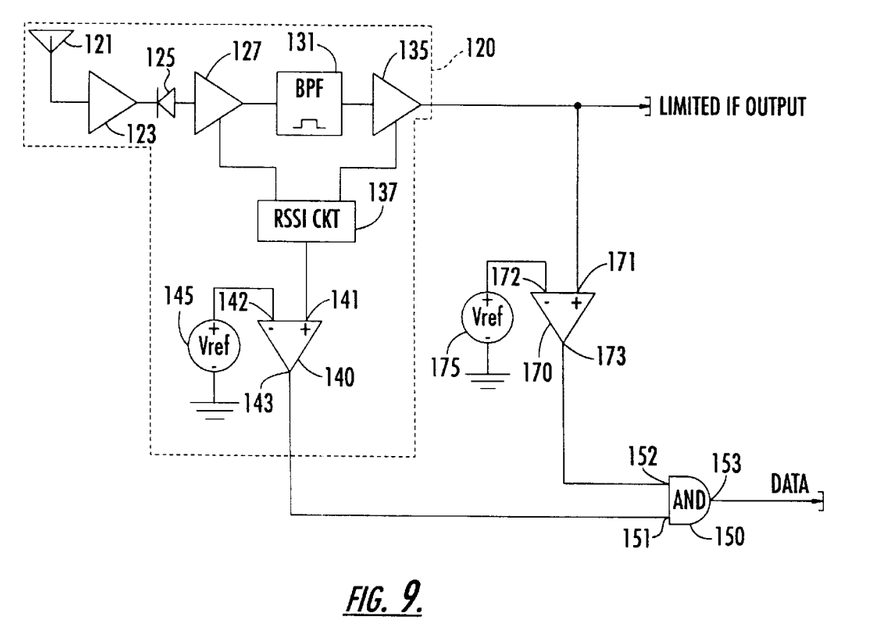
FIG. 9 is a PPM/PWM receiver diagram.

This common portion of each of the FSK and PPM/PWM receivers is shown within broken lines 120 of the FSK receiver diagram of FIG. 4 and the PPM/PWM receiver diagram of FIG. 9. In the FSK receiver diagram of FIG. 4, the common receiver portion includes a narrow band antenna 121, to provide a measure of RF selectivity, and thereby reject out of band interference. The output of narrow band antenna 121 is coupled through an optional preamplifier 123 to an AM detector 125. As a non-limiting example, the AM detector 125 may be implemented as a relatively simple diode detector or by other means more easily incorporated into an RF integrated circuit. The output of the AM detector 125 is the recovered pulse train that was originally transmitted by the OOK transmitter (and encoded as either FSK or PPM/PWM data).

These pulses are amplified by a high gain low noise IF amplifier 131 and then band-pass filtered by a band-pass filter 133, whose bandwidth is chosen to result in acceptably low distortion and/or ringing of the received pulse groups. The band-pass filter's center frequency determines the receiver's IF center frequency and is matched to the transmitter's on/off keying rate. The majority of the receiver's selectivity is obtained by the choice of the bandwidth of this filter. For low cost implementations filter 133 may be realized as an active filter and is part of the overall RFIC. Low cost ceramic or other passive components may be used. The output of band-pass filter 133 is coupled to one or more limiting amplifier stages 135, which are operative to remove any amplitude modulation from the recovered pulses. The amplitudes of the recovered pulses are measured by means of a conventional received signal strength indicator (RSSI) circuit 137 that is coupled to each of amplifier stages 127 and 135.

The output of the RSSI circuit 137 is coupled to a first input 141 of a comparator 140, a second input 142 of which is coupled to receive a prescribed 'valid' signal level threshold from a threshold reference source 145. The output 143 of comparator 140 is coupled as a first input 151 of (AND) gate 150. A second input 152 of gate 150 is coupled to receive the recovered data waveform. The use of comparator 140 and gate 150 serves to ensure that a sufficient signal level was present to provide valid data, and thereby prevent potentially false data from being coupled to downstream digital processing circuitry, to be described below referring to FIG. 6.

The recovered IF at the output of limiting amplifier stage 135 is coupled to the digital tone detector of FIG. 5 (to be described), and to an FM discriminator circuit, shown as a conventional resonant quadrature detector 160. The output of the FM discriminator 160, as filtered by a low pass filter 162, will vary between two voltages as determined by the OOK rate of the transmitter. This alternating voltage signal is converted to respective logic levels for downstream digital processing by means of a comparator 170. Specifically, comparator 170 has a first input 171 coupled to receive the output of low pass filter 162, and a second input 172 coupled to receive a prescribed data threshold from a threshold reference source 175. The output 173 of comparator 170 is coupled as a second input 152 of (AND) gate 150.

The FM-IF signal processing path provides very high gain (typically 100 dB or more) and thus provides the majority of the receiver's gain. This gain is at the IF frequency (typically 455 KHz) and can be made to consume less than 1 mA in a properly designed RFIC. The very high FM-IF gain level provides the benefit of high receiver sensitivity, but also causes the receiver to limit on its own noise when no signal is present.

As described above, gate 150 serves to ensure that a sufficient signal level was present to provide valid data, and prevents potentially false data from being coupled at its output 153 to the downstream digital processing circuitry of FIG. 6. (Additional data validation is accomplished in the receiver's digital processor.) It should be noted that the output of the FSK receiver is the transmitted data. No additional demodulation is required in the receiver's digital processor to recover the data. The digital processor handles the problem of synchronizing the receiver to the serial data stream sent by the transmitter, separating the data into appropriate groups and validating the data.

OOK Digital Tone Detector (FIG. 5)

FIG. 5 diagrammatically illustrates a digital tone detector that is used to validate the incoming OOK data by verifying that the OOK pulse repetition rate is correct.

This information is used in conjunction with a signal amplitude measurement made using the RSSI circuit 137 of the receiver circuitry of FIG. 4, described above, to validate the received signal. For this purpose, the digital tone detector comprises a first counter 180 that is used to provide a sample interval based on the IF reference frequency. Counter 180 has its clock port 181 coupled to receive an IF reference clock signal, and is operative to generate a carry output signal at its output port 182 at the end of each sample interval. The output port 182 of counter 180 is coupled to the clear port 213 of a second counter 210 and to the clock port 223 of a DATA VALID flip-flop 220. The clear port 183 of counter 180 is coupled to receive a strobe (START RX MODE) that starts receiver operation.

The flip-flop 190 serves as a simple digital mixer. The input (D) port 191 of flip-flop 190 is coupled to receive the detected/limited signal supplied at the output of the limiting amplifier stage 135 of the RF receiver circuit of FIG. 4, described above. The clock port 193 of flip-flop 190 is coupled to receive the IF reference clock signal that also drives the clock port 181 of counter 180. The output port 192 of flip-flop 190, which represents the difference frequency between the detected/limited signal and the IF reference, is coupled to the clock port 211 of counter 210.

Counter 210 counts the number of difference frequency pulses output by the flip-flop 190 during the sample interval determined by counter 180. The clock port 211 of the counter 210 is coupled to the output port 192 of the flip-flop 190. The clear port 213 of counter 210 is coupled to the carry output port 182 of the counter 180 to zero the counter 210 at the start of each sample period. The output port 212 of counter 210 is coupled to the comparison logic circuit 200.

The comparison logic circuit 200 is used to determine if the number of difference frequency pulses received during the sample period is within the range of values that would be produced by one of the two OOK/FSK frequencies. If the number of pulses is within the proper range, the output of the comparison logic circuit 200 is set to a logical 'one' and clocked into DATA VALID flip-flop 220; otherwise, a logical 'zero' is clocked into the DATA VALID flip-flop 220.

The output of the comparison logic circuit 200 is coupled to the input port 221 of the DATA VALID flip-flop 220. The clock port 221 of DATA VALID flip-flop 220 is coupled to the carry output port 182 of counter 180, so that the comparison logic circuit output is latched at the end of every sample interval. The Q output port 222 of the DATA VALID flip-flop 220 is coupled to the digital processing circuitry of FIG. 6.

The IF reference clock is readily implemented by means of an oscillator comprised of inverters and a low cost 455 KHz ceramic resonator.

Digital FSK Processing Circuitry (FIG. 6)

The digital portion of the OOK-FSK receiver, shown diagrammatically in FIG. 6, is operative to integrate the received data that has been validated by the RSSI and digital tone detector circuits of FIGS. 4 and 5, described above, verifies and synchronizes to the preamble, converts the validated data into parallel format, and writes it to system RAM 100.

For this purpose, a first, bit/sample timing counter 310 has its clock input 311 coupled to receive a system clock and is used to count the time interval for each bit received. Counter 310 has its clear input 312 coupled to output 324 of a comparison logic circuit 320, and its Q output 313 coupled to the input 321 of comparison logic circuit 320. Comparison logic circuit is operative to synchronously clear the counter 310 each time the count is equal to a prescribed fraction (e.g., ⅛) of the transmission time for one bit until the first byte of the preamble is received. Counter 310 is also cleared when the count is equal to the transmission time for one bit.

A second, data integration counter 330, which has its up/down port 331 coupled to receive the data provided at the Q output port 223 of VALID flip-flop 220, is operative to integrate the received data. Counter 330 has its clock input 332 coupled to receive the system clock, and its clear input 333 coupled to the output 325 of comparison logic circuit 320. The Q output port 334 of counter 330 is coupled through logic circuit 340 to a differential decoder 350. If the received data is at a first 'high' logic level, counter 330 is incremented; if the data is at a second, 'low' logic level, counter 330 will decrement. Counter 330 is synchronously cleared by comparison logic circuit 320, when counter 310 reaches its sample count for the first byte of the preamble, or the bit count for the remainder of the receive time.

If the data integration counter 330 is greater than zero when the synchronous clear is applied, a logical 'one' bit is coupled through logic circuit 340 and differential decoder 350 to serial input ports 361 and 371 of respective data and preamble shift registers 360 and 370. The data and preamble shift registers 360 and 370 are controllably clocked by coupling the output 325 of the comparison logic circuit 320 to respective shift inputs 362 and 372 of the shift registers. If the counter 330 is less than zero, a logical 'zero' is coupled to the shift registers.

The data shift register 360 is operative to shift in data as it is received, and then make available a respective 8-bit byte of data at its parallel output port 363 after each complete byte is received. The data shift register 360 is not employed until after the first byte of the preamble portion of the message has been successfully received. Similarly, the preamble shift register 370 is used to store each sample of the preamble portion of an incoming message. Preamble shift register 370 is clocked each time the contents of counter 310 reach a predetermined value. The preamble shift register 360 has its Q output coupled to input 323 of comparison logic circuit 320.

A third (multi-bit e.g., three-bit) counter 380 is used to count the number of bits received in each byte. Counter 380 has its clock input 381 coupled to output 326 of the comparison logic circuit 320 and is incremented when the counter 320 reaches a predetermined value. Counter 380 has its clear input 382 coupled to output 327 of comparison logic circuit 320, which maintains counter 380 in an asynchronous clear state until the preamble of the message has been detected. When the contents of the (three-bit) counter 380 are all 'ones' and the contents of counter 310 are at a predetermined value between the shift register shift-in value and the increment value of counter 380, logic circuit 320 provides an output on line 328, so that a received data byte at output 363 of shift register 360 is written into RAM 100.

Counter 380 has its carry output 383 coupled to the clock input 391 of a fourth, data pointer counter 390 that is used as a data pointer for writing the received data into RAM 100. Data pointer counter 390 is incremented each time the third counter 380 rolls over and the first counter 320 reaches a predetermined value. Like counter 380, the data pointer counter 390 has its clear input 392 coupled to the output 327 of comparison logic circuit 320, so that counter 390 is held in an asynchronous clear state until the preamble of the message has been detected. The carry output 393 of counter 390 is used as an address/pointer input to the address port of RAM 100.

A fifth, correlation factor counter 410 is used to count the correlation factor for the first byte of a received preamble. Counter 410 has a clock input 411 coupled to output 327 of logic circuit 320 and its clear input 412 coupled to output 325 of the comparison logic circuit 320. The Q output 413 of counter 410 is coupled to input 322 of logic circuit 320. Logic circuit 320 is operative to compare the contents of the preamble shift register 370 with a preamble reference for all 64 samples (8-bits times 8 samples/per bit) of the preamble. If the received sample matches the reference, the counter 410 is incremented; if not, the contents of the counter 410 are not incremented. Once the contents of the counter 410 reaches a predetermined correlation value, the preamble is considered valid, the logic circuit 320 switches to bit integration mode for processing data subsequent to the preamble, as described above. The counter 410 is synchronously cleared by the output 325 of logic circuit 320 every time the contents of counter 310 reach the sample count.

OOK-PPM/PWM Modulation (FIGS. 7–10)

Figure 7:
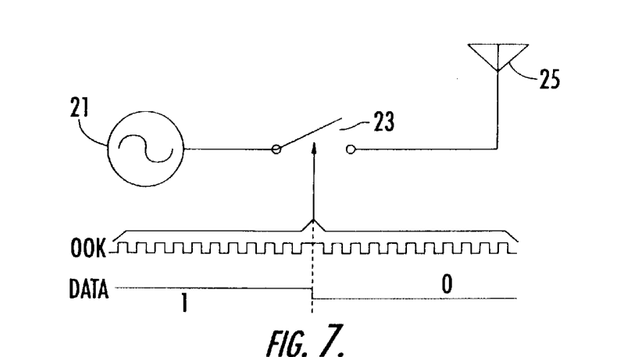
FIG. 7 diagrammatically illustrates the transmitter of the OOK-PPM/PWM embodiment of the invention.
Figure 8:
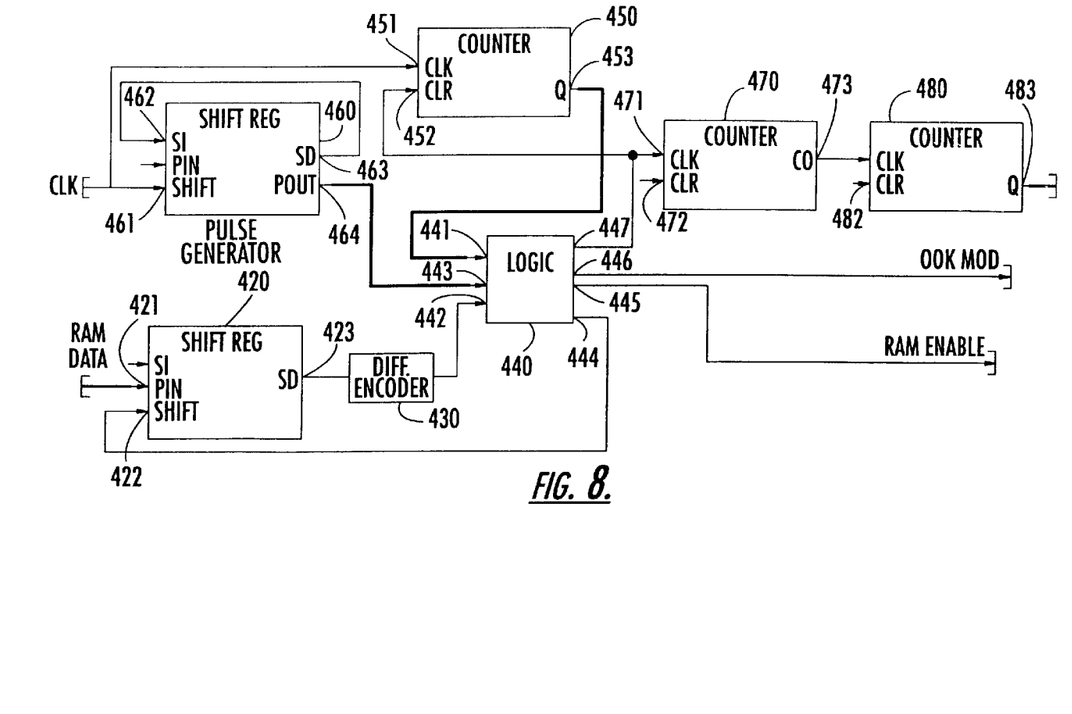
FIG. 8 diagrammatically illustrates the digital portion of an OOK-PPM/PWM transmitter.

PPM/PWM-OOK Transmitter (FIGS. 7–8)

A second embodiment of the invention, diagrammatically illustrated in FIGS. 7–10, employs pulse position/width modulation (PPM/PWM). As shown diagrammatically in FIG. 7, similar to the FSK-OOK embodiment of FIG. 2, the data output of transmitter 21 is coupled through the on-off keyed switch 23 to narrow bandwidth antenna 25. In the second embodiment of OOK-PPM/PWM operation, the output of transmitter 21 is keyed on and off by pulses that may be shifted in phase, position/width in accordance with the data, rather than using different frequencies to denote different data values. In the second PPM/PWM embodiment, the OOK pulse rate is maintained at a fixed IF center frequency. Data is encoded by shifting the phase of groups of pulses by 180 degrees from following groups where the data bit is a first logical value, (e.g., '1'), and not shifting it where the data bit has a second logical value (e.g., '0'). A shift in phase is effected by beginning the next pulse group one half (or some whole number plus a half) OOK periods at the IF center frequency where a 180 degree phase shift is needed. Otherwise, the next pulse group is transmitted one OOK period after the transmission of the last pulse in the previous group.

The digital portion of the OOK-PPM transmitter circuit is diagrammatically illustrated in FIG. 8 as comprising an arrangement of counters and shift registers, that are operative to address and read the system RAM 100 to obtain parallel data and then converts this data into the OOK modulation pulses representing the differentially encoded serial data. To this end, a first shift register 420 has its parallel input port 421 coupled to the system RAM 100 from which the preamble byte, data byte, or CRC byte to be transmitted are successively read out. A clock port 422 of shift register 420 is clocked by output 444 of a comparison logic circuit 440, as each bit is transmitted.

Comparison logic circuit 440 is operative to synchronously load parallel data into the shift register 440 in response to detecting that the contents of a first, bit-timer counter 450 are zero. For this purpose, logic circuit 440 has an input 441 coupled to the Q output 453 of counter 450. As data is serially shifted out from the output 423 of shift register 420, it is differentially encoded by an encoder 430 and applied to input port 442 of comparison logic circuit 440. Comparison logic circuit 440 has a first output 445 coupled to the enable port of system RAM 100 and a second output 446 that provides a duty cycle waveform to be applied to the on-off keyed switch 23 of FIG. 7.

A second shift register 460 is used to generate the OOK pulses at a data rate corresponding to the IF center frequency. For this purpose shift register 460 has its shift input port 461 coupled to receive the system clock. Its serial output port 463 is tied back to its serial input port 462. Its output port 464 is coupled to input 443 of comparison logic circuit 440. The duty cycle is determined by the number of sequential logical '1' bits that are preloaded into the shift register 460. The phase of the transmitted data may be determined by selecting respectively different stages of the shift register 460, such as either the last stage or the middle stage of the shift register 460, in accordance with the bit value of the data.

The bit-timer counter 450 has its clock input 451 coupled to receive the system clock signal that is applied to the shift input 461 of shift register 460, and is operative to count the time that each bit is transmitted. The bit-timer counter 450 has its clear input 452 coupled to output 447 of comparison logic circuit 440, which is also coupled to the clock input 471 of a multi-bit (e.g., three-bit) counter 470. The shift register 460 will cycle data several times during this interval. Counter 450 is cleared by the output 447 of logic circuit 440 and is also synchronously cleared by a start transmission signal. Counter 470 is used to count how many bits have been sent for each byte, and is incremented or clocked every time that counter 450 is synchronously cleared. Counter 470 is synchronously cleared by the start transmission signal applied to its clear input 472. Counter 470 has its output 473 coupled to the clock input 481 of a data byte pointer counter 480, so that counter 480 is incremented every time the (three-bit) counter 470 rolls over (from '111' to '000'), except during transmission of the preamble byte. Counter 480 is synchronously cleared by the application of a start transmission signal to its clear or reset input 482. The Q output 483 of counter 480 is coupled to the address port of system RAM 100.

Figure 10:
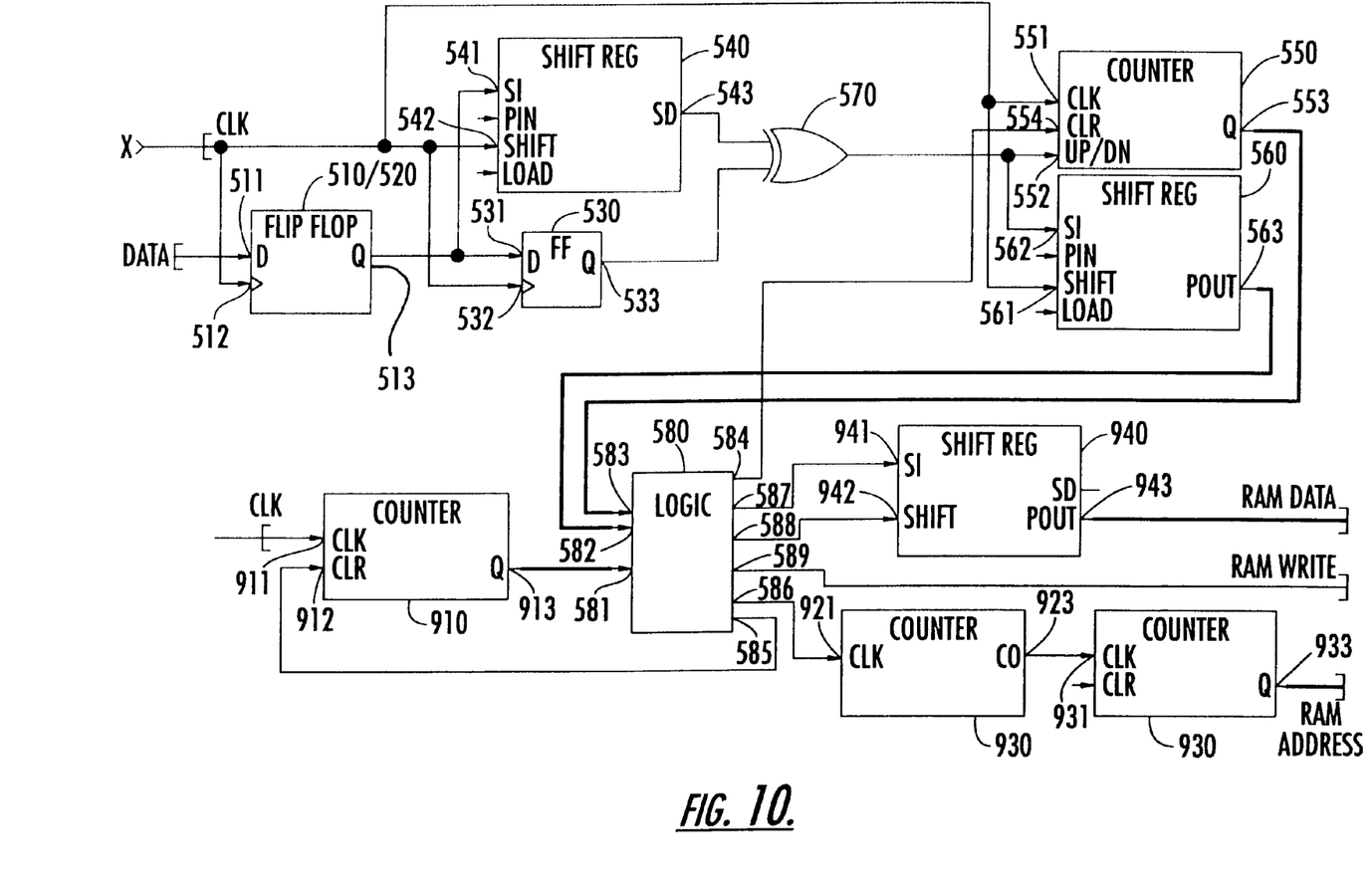
FIG. 10 diagrammatically illustrates the digital portion of an OOK-PPM/PWM receiver.

PPM/PWM-OOK Receiver (FIGS. 9–10)

As in the first embodiment of FIGS. 2–6, that portion of the PPM/PWM receiver which is common to the FSK receiver is shown within broken lines 120 of the PPM/PWM receiver diagram of FIG. 9. Since this portion of each receiver has already been described, it will not be repeated here. In the PPM/PWM embodiment, since there is no FM demodulator, the recovered IF signal at the output of limiting amplifier stage 135 is coupled directly to each of the digital tone detector of FIG. 5 (described above), and comparator 170. As described previously with reference. to FIG. 6, the output of the comparator 170 is gated through AND gate 150 to ensure that a sufficient signal level is present to provide valid data, and prevent potentially false data from being coupled to the downstream digital processing circuitry of FIG. 10.

Digital PPM/PWM Processing Circuitry (FIG. 10)

The digital portion of the OOK-PPM/PWM receiver, shown diagrammatically in FIG. 10, is operative to recover phase information in the received encoded data stream. Although the OOK-PPM/PWM receiver's digital processor is somewhat more complex than the OOK-FSK digital processor, the OOK-PPM/PWM digital processing circuitry effectively performs all of the same tasks as the OOK-FSK processor in addition to decoding the data. The digital receiver circuitry operates at a sample clock rate that is at approximately ¼ the time between incoming OOK pulses. As will be described, the digital PPM/PWM receiver uses an up/down counter mode of operation to provide reliable data detection in environments where some input pulses will be corrupted. The circuit compares the phase of each bit of the received data validated by the RSSI threshold and comparator-gate 137 of the receiver 120 in FIG. 9, and digital tone detector circuitry of FIG. 10, verifies and synchronizes to the preamble, converts the data to parallel and writes it to system RAM 100.

For this purpose, a set of cascaded 'squaring' flip-flops 510, 520 and 530 are used to square the incoming pulse stream applied to the D input 511 of flip-flop 510 and clocked by a sample clock signal applied to clock input 512 into a square wave with a stable duty cycle. The Q output 513 of flip-flop 510 is further coupled to the serial data input port 541 of shift register 540. The shift/clock port 542 of shift register 540, the clock input 551 of a counter 550, and the shift/clock input port 561 of a shift register 560 are also clocked by the sample clock signal. The length of shift register 540 is sufficient to store samples for an entire bit (corresponding to the number of pulses per bit times the number of samples per pulse). The output 543 of the shift register 540 and the Q output 533 of the flip-flop 530 are coupled to exclusive OR circuit 570, in order to detect phase shifts in the squared up data signal. The output 573 of the exclusive OR circuit 570 is coupled to an up/down control input 552 of counter 550 and to the serial data input 562 of the shift register 560. The Q output of counter 550 is coupled to input 583 of comparison logic circuit 580. The parallel data output of shift register 560 is coupled to input 582 of comparison logic circuit 580.

The output of exclusive OR circuit 570 is thus shifted into shift register 560 at the sample rate, and is used to detect transitions from a series of '1's to '0's and from a series of '0's to '1's. The number of '1's and '0's is selected to minimize false transition detects. A comparison logic circuit 580 is configured to determine whether either several '1's are followed by several '0' s or vise versa, and clears or counters, as will be described. The counter 550, which is controllably incremented or decremented at the sample rate by application of the sample clock signal to its clock input port 551, is synchronously cleared at clear port 554 by a transition detection signal produced at output port 584 of combination logic circuit 580, or when the counter 550 has counted up or down to a count value that is equal to the number of pulses per bit times the number of samples per pulse.

A second, bit/sample timing counter 910 has its clock input 911 coupled to receive a system clock and is used to count the time at which each bit is received. Counter 910 is pre-loaded with a value equal to the time required to detect a transition when input data transitions are detected. Counter 910 has its clear input 312 coupled to output 585 of comparison logic circuit 580, and its Q output 913 coupled to input port 581 of comparison logic circuit 580. Comparison logic circuit 580 is operative to synchronously clear counter 910 each time the count is equal to the transmission time of one bit.

A third (multi-bit e.g., three-bit) counter 920 is used to count the number of bits received in each byte. Counter 920 has its clock input 921 coupled to output 586 of the comparison logic circuit 580 and is incremented when the counter 910 reaches a predetermined value. Counter 920 is held in asynchronous clear mode until the preamble is detected. Its output 923 is coupled to the clock input 931 of a data pointer counter 930, the output 933 of which is used as a data pointer address for writing the received data into RAM 100. Data pointer counter 930 is incremented each time the counter 920 rolls over. It is held in asynchronous clear mode until the preamble is detected.

A third shift register 940 is operative to shift in data as it is received, and then make available a respective 8-bit byte of data at its parallel output port 943 for loading into RAM 100 after each complete byte is received. For this purpose, data shift register 940 has its serial input port 941 coupled to output port 587 and its shift/clock port 942 coupled to the output port 588 of the comparison logic circuit 580. The data shift register 940 is not employed until after the first byte of the preamble portion of the message has been successfully received. Register 940 is shifted or clocked each time the contents of counter 910 reach a predetermined value. The value shift in is determined by the first up/down counter value of counter 550. Two predetermined windows determine whether counter 550 has counted up sufficiently to constitute a logical '1' or down enough to constitute a logical '0'. Comparison logic circuit 580 provides an output on line 589, so that a received data byte at output 943 of shift register 940 is written into RAM 100.

As will be appreciated from the foregoing description, through a combination of on-off keyed (OOK) and frequency shift keyed (FSK) or pulse position/width modulation (PPM/PWM), the short-range communication system of the present invention can be readily implemented with relatively low cost and low primary power consumption components. A communications link consisting of a receiver and a transmitter was functionally verified at a radio frequency of 2467 MHz (although any acceptable UHF or microwave frequency may be used) over a range from one inch up to one-hundred feet. Both modulation techniques described above were separately tested and a set of communications protocols including means for waking up the target receiver, synchronization and data transmission and reception from each modulation type were verified.

As described above, among the benefits of the present invention are the fact that the antenna provides RF selectivity for both the receiver and the transmitter. A single IF band-pass filter may be realized in active form as a portion of the RFIC or passively in the form of a low cost ceramic filter such as those used in inexpensive transistor radios. Current consumed by the complete receiver is very small (less than 5 mA). The receiver is active only 0.1% of the time, which results in very low battery drain. The transmitter is only active during actual communication and therefore its 30 mA current drain is not a significant factor in total battery life. The digital portion of the system can be realized using low cost, and ultra low power CMOS logic. Battery life is dominated by the current consumption of the receiver and internal leakage. The resulting system provides a robust, low power data link operating at up to 50 kilobaud, and realized at very low cost.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. A communication system comprising a transmitter exclusive of an up-conversion local oscillator that is operative to transmit an RF signal modulated with a baseband signal as on-off keyed (OOK) modulation and one of frequency shift keyed (FSK) and pulse position/width modulation (PPM/PWM), and a receiver that is operative to receive and demodulate said RF signal and recover information contained therein.

2. A communication system according to claim 1, wherein said RF signal comprises an OOK RF signal modulated with FSK modulation representative of said information.

3. A communication system according to claim 1, wherein said RF signal comprises an OOK RF signal modulated with PPM/PWM modulation representative of said information.

4. A communication system according to claim 1, wherein said information comprises a data signal that is differentially encoded prior to modulation with said OOK modulation and said one of FSK and PPM/PWM modulation.

5. A communication system according to claim 2, wherein said transmitter is operative to encode first and second logical states of an information signal as first and second OOK pulse waveforms having respectively different frequencies, one above and one below an IF center frequency.

6. A communication system according to claim 5, wherein said transmitter comprises a digital signal processing circuit that is operative to access data stored in a system random access memory (RAM) and convert the accessed data into OOK-FSK modulation pulses representative of differentially encoded serial data.

7. A communication system according to claim 1, wherein said receiver includes signal detection circuitry that is operative to demodulate both OOK-FSK and OOK-PPM/PWM transmissions.

8. A communication system according to claim 7, wherein said receiver includes a narrow band antenna, the output of which is coupled to an AM detector, that derives a pulse train transmitted by said transmitter, said AM detector being filtered by way of a band-pass filter having a center frequency matched to the OOK rate of said transmitter, said band-pass filter being coupled to a received signal strength indicator circuit, the output of which is compared with a prescribed signal level threshold, to controllably gate a received signal waveform, to prevent potentially false data from being coupled to digital processing circuitry, which recovers said information.

9. A communication system according to claim 8, wherein said receiver comprises an FSK receiver having an FM discriminator circuit and a digital tone detector that is operative to validate received OOK data, and digital FSK processing circuitry that is operative to integrate the received data validated by said received signal strength indicator and threshold comparator circuit and digital tone detector circuit, and to store validated recovered data to system memory.

10. A communication system according to claim 3, wherein said transmitter is operative to encode first and second logical states of an information signal as first and second OOK PPM/PWM waveforms of the same IF center frequency, and shifted in phase by respectively different first and second phase shift amounts.

11. A communication system according to claim 10, wherein said transmitter comprises a digital signal processing section that is operative to access data stored in a system random access memory (RAM) and convert the accessed data into OOK modulation pulses representative of differentially encoded serial data.

12. A communication system according to claim 7, wherein said receiver comprises a PPM/PWM receiver that includes a narrow band antenna, the output of which is coupled to an AM detector, that derives a pulse train transmitted by said transmitter, said AM detector being filtered by way of a band-pass filter having a center frequency matched to the OOK rate of said transmitter, said band-pass filter being coupled to a received signal strength indicator circuit, the output of which is compared with a prescribed signal level threshold, to controllably gate a received signal waveform, to prevent potentially false data from being coupled to PPM/PWM digital processing circuitry, which recovers phase information in the received encoded data stream.

13. A communication system according to claim 12, wherein said PPM/PWM digital processing circuitry comprises an up/down counter controlled circuit that operates at a sample clock rate that is at a prescribed fraction of the time between incoming OOK pulses.

14. A method of conveying information between first and second devices, comprising the steps of:

(a) encoding an information signal as one of a baseband frequency shift keyed (FSK) modulated signal and a pulse position/width modulation (PPM/PWM) signal; and (b) transmitting from said first device an on-off keyed (OOK) modulated RF signal that is modulated with said one of said baseband frequency shift keyed (FSK) and pulse position/width modulation (PPM/PWM) signals representative of information encoded in step (a).

15. A method according to claim 14, further including the step of:

(c) at said second device, receiving and demodulating said OOK modulated RF signal that has been modulated with said one of frequency shift keyed (FSK) and pulse position/width modulation (PPM/PWM), and recovering said information.

16. A method according to claim 14, wherein said OOK RF signal is modulated with FSK modulation representative of said information.

17. A method according to claim 14, wherein said OOK RF signal is modulated with PPM/PWM modulation representative of said information.

18. A method according to claim 14, wherein step (b) comprises transmitting first and second OOK pulse waveforms having respectively different frequencies, one above and one below an IF center frequency.

19. A method according to claim 15, wherein step (c) comprises receiving said OOK modulated RF signal by way of a narrow band antenna, coupling the output of said narrow band antenna to an AM detector, filtering a pulse train derived by said AM detector through a band-pass filter having a center frequency matched to the OOK transmission rate, coupling said band-pass filter being to a received signal strength indicator circuit, the output of which is compared with a prescribed signal level threshold, to controllably gate a received signal waveform, to prevent potentially false data from being coupled to digital processing circuitry, and recover said information.

20. A method according to claim 19, wherein step (c) further comprises coupling a received signal to an FSK receiver having an FM discriminator circuit and a digital tone detector that is operative to validate received OOK data, and digital FSK processing circuitry that is operative to integrate the received data validated by said received signal strength indicator circuit and digital tone detector circuit, and to store validated recovered data to system memory.

21. A method according to claim 17, wherein step (b) comprises transmitting transmitter first and second OOK PPM/PWM waveforms of the same IF center frequency, and shifted in phase by respectively different first and second phase shift amounts, encoded in step (a) in accordance with first and second logical states of said information.

22. A method according to claim 21, further including the step (c) of, at said second device, receiving and demodulating, by PPM/PWM digital processing circuitry, said OOK modulated RF signal that has been modulated with said one of frequency shift keyed (FSK) and pulse position/width modulation (PPM/PWM), and recovering said information.

* * * * *